US011988036B2

(12) United States Patent
Mak et al.

(10) Patent No.: US 11,988,036 B2
(45) Date of Patent: May 21, 2024

(54) FLOOD SEAL ARRANGEMENT

(71) Applicant: WILLIAM M SNAPE MANUFACTURING SERVICES (UK) LIMITED, Preston (GB)

(72) Inventors: Claudia Tszching Mak, Leyland (GB); William Malcolm Snape, Leyland (GB)

(73) Assignee: WILLIAM M SNAPE MANUFACTURING SERVICES (UK) LIMITED, Preston (GB)

( * ) Notice: Subject to any disclaimer, the term of this patent is extended or adjusted under 35 U.S.C. 154(b) by 0 days.

(21) Appl. No.: 17/891,692

(22) Filed: Aug. 19, 2022

(65) Prior Publication Data

US 2023/0053862 A1 Feb. 23, 2023

(30) Foreign Application Priority Data

Aug. 19, 2021 (GB) ..................................... 2111929

(51) Int. Cl.
*E06B 7/23* (2006.01)

(52) U.S. Cl.
CPC .................................. *E06B 7/2307* (2013.01)

(58) Field of Classification Search
CPC ...... E06B 7/2307; E06B 7/2301; E06B 7/231; E06B 7/232; E06B 7/23
USPC ........................................................... 49/469
See application file for complete search history.

(56) References Cited

U.S. PATENT DOCUMENTS 2,935,771 A 5/1960 Hatcher, Jr.
5,784,834 A * 7/1998 Stutzman .............. E06B 7/2307 49/197
6,550,217 B2 * 4/2003 Heung-Bin ............... E06B 7/36 52/204.51
6,772,560 B2 * 8/2004 Dischiant .................. E06B 7/23 49/197
8,881,464 B1 * 11/2014 Huckeba ............... E06B 1/6046 49/489.1
9,045,937 B2 * 6/2015 Peck ......................... E06B 7/16
2005/0000165 A1 1/2005 Dischinat et al.
(Continued)

FOREIGN PATENT DOCUMENTS

DE 196 10 428 A1 9/1997
DE 299 19 655 U1 3/2001
EP 1 582 687 A2 10/2005
(Continued)

OTHER PUBLICATIONS

Mar. 16, 2021, Combined Search and Examination Report issued in British Patent Application No. GB2016048.7.
(Continued)

*Primary Examiner* — Daniel J Troy
*Assistant Examiner* — Susan M. Heschel
(74) *Attorney, Agent, or Firm* — Oliff PLC

(57) ABSTRACT

A kit of parts for flood-proofing a door, including: a resilient seal member including a main body and a head; a non-resilient mounting member for securing the seal member to a door frame, the mounting member defining a support surface configured to receive the seal member and defining a mounting surface locatable against the door frame, wherein a channel is formed in the support surface, the head of the seal member insertable into the channel to mate the seal member and the mounting member.

16 Claims, 6 Drawing Sheets

(56) References Cited

U.S. PATENT DOCUMENTS

| | | | | |
|---|---|---|---|---|
| 2008/0265528 | A1 | 10/2008 | Heiman et al. | |
| 2022/0259911 | A1* | 8/2022 | Kunkel | E06B 5/12 |

FOREIGN PATENT DOCUMENTS

| | | | |
|---|---|---|---|
| GB | 1 258 563 | A | 12/1971 |
| GB | 2 019 473 | A | 10/1979 |
| GB | 2 361 952 | A | 11/2001 |
| GB | 2525382 | B | 3/2016 |
| GB | 2599704 | A | 4/2022 |
| JP | S52-68026 | U | 5/1977 |
| JP | S63-58186 | U | 4/1988 |
| JP | 2021-031992 | A | 3/2021 |

OTHER PUBLICATIONS

Aug. 25, 2015, Combined Search and Examination Report issued in British Patent Application No. GB1406338.2.

Dec. 21, 2022, (Jan. 4, 2023), Extended European Search Report issued in European Patent Application No. 22190976.5.

Feb. 17, 2022 Combined Search and Examination Report issued in British Patent Application No. GB2111929.2.

William Snape; StormMeister Active Flood Seal Anmation Inward Opening Doors; YouTube Video; 2019; https://www.youtube.com/watch?v=JqRwi-FngTg.

* cited by examiner

FLOOD SEAL ARRANGEMENT

FIELD

The present disclosure relates in general to a flood seal arrangement and particularly, but not exclusively, to a flood seal arrangement for timber doors.

BACKGROUND

Ingress of floodwater into a building is a known problem, potentially causing significant damage and long-term detriment to the building. Floodwater may enter a building particularly through any building element forming an opening in the building, such as a door or a window. Even a closed door (or window) may not prevent seepage of floodwater into the building.

A known form of flood protection involves a flood seal provided in the door (or window) such that the door is sealed against ingress of floodwater whenever the door is shut. More precisely, a gasket formed from a resilient material may be provided on the door frame and, alternatively or additionally, a similar gasket may be arranged on the door leaf. Upon closing the door, the gasket seals a gap formed between the door leaf and the door frame to inhibit or entirely prevent ingress of floodwater.

Specific doors are manufactured with a flood seal already accommodated, as this is conveniently done at the time of manufacturing. However, it may not be desirable to replace an existing door. For example, it may be financially unfeasible to replace certain heritage doors made from timber with custom-made flood doors of the same materials and appearance. Furthermore, it may be very costly even to modify existing heritage doors with grooves receiving gaskets or features, since such work may not be possible on site.

An alternative flood seal arrangement is therefore highly desirable.

SUMMARY

Accordingly, there is provided a flood seal arrangement. The flood seal arrangement is provided as a kit of parts and there is provided a method of flood-proofing using the kit of parts, as set out in the appended claims.

The kit of parts is for flood-proofing of a door or window. The kit of parts comprises a seal member and a mounting member. The seal member comprises a main body and a head. The mounting member defines a support surface configured to receive the seal member and defines a mounting surface locatable against a door frame for securing the seal member to the door frame. A channel is formed in the support surface and the head of the seal member is insertable into the channel to mate the seal member and the mounting member. The seal member is resilient, i.e. resiliently deformable, while the mounting member is non-resilient, i.e. less resilient than the seal member.

According to some examples, the support surface comprises a first portion and a second portion. The main body of the seal member engages the first portion and the second portion when mated with the mounting member.

According to some examples, the first portion and the second portion are perpendicular.

According to some examples, the channel is formed in the first portion of the support surface.

According to some examples, a plurality of apertures is formed in the second portion of the support surface. Each aperture is for receiving a mechanical fastener.

According to some examples, the mounting member comprises a groove formed in the support surface. The seal member extends across the groove when the seal member and the mounting member are mated.

According to some examples, the groove is formed in the first portion of the support surface.

According to some examples, the seal member is removable from the mounting member by pulling the seal member away from the mounting member and removing the head of the seal member from the channel in the mounting member.

According to some examples, a groove is formed in the mounting surface. Preferably the groove is for receiving sealant or adhesive.

There is provided a timber door having a door frame fitted with the kit of parts as described above. The timber door is optionally configured as an inward-opening timber door.

According to some examples, the timber door comprises a mechanical fastener securing the flood seal to the door frame. The main body of the seal member engages the first portion and the second portion when mated with the mounting member, and the mechanical fastener extends through the second portion of the support surface.

According to some examples, a head end of the mounting member is arranged flush with the door frame.

The method of flood-proofing is applicable to a timber door or window. The method comprises provided the kit of parts as described above. The method further comprises securing the support portion to a door frame of the timber door, and securing the seal portion to the support portion.

According to some examples, the method comprises removing part of the door frame to form a recess in the door frame, and locating the mounting member in the recess before securing the mounting member to the door frame.

According to some examples, the method comprises securing additional timber to the door frame, and locating the mounting member against the additional timber before securing the mounting member to the door frame.

According to some examples, the securing of the support portion to the door frame comprises locating a mechanical fastener through the mounting member, and subsequently securing the seal member to the mounting member.

BRIEF DESCRIPTION OF DRAWINGS

For a better understanding of the invention, and to show how example embodiments may be carried into effect, reference will now be made to the accompanying drawings in which.

DESCRIPTION OF EMBODIMENTS

The present disclosure relates to a seal arrangement for flood-proofing. The seal arrangement is provided as a kit of parts useable for flood-proofing doors and windows, and especially timber doors and windows. The seal arrangement is also useable in a method of retrofitting doors and windows. For example, the seal arrangement provided as a kit of parts may be configured to flood proof a door. In other words, the seal arrangement may be specifically adapted in order to flood proof a door when deployed (as shown in the accompanying Figures, for example). As used herein, the term flood proofing is used to refer to providing a seal which inhibits or prevents the ingress of floodwater to a greater degree than known mere weather seals (e.g., intended to protect against wind and rain) comprising resilient material. For example, general prior art weather seals (as opposed to seals specifically intended for flood-proofing) may allow ingress of floodwater as pressure on the weather seal due to floodwater increases. However, the present seal arrangement is configured such that it withstands greater pressure from floodwater as compared to prior art general weather seals (as opposed to seals specifically intended for flood-proofing) without allowing ingress of floodwater. For example, the described seal arrangement is specifically adapted for the context of floodwater rather than merely being a general weather seal, although the described seal arrangement may be advantageous in applications other than only flood proofing.

Figure 1:
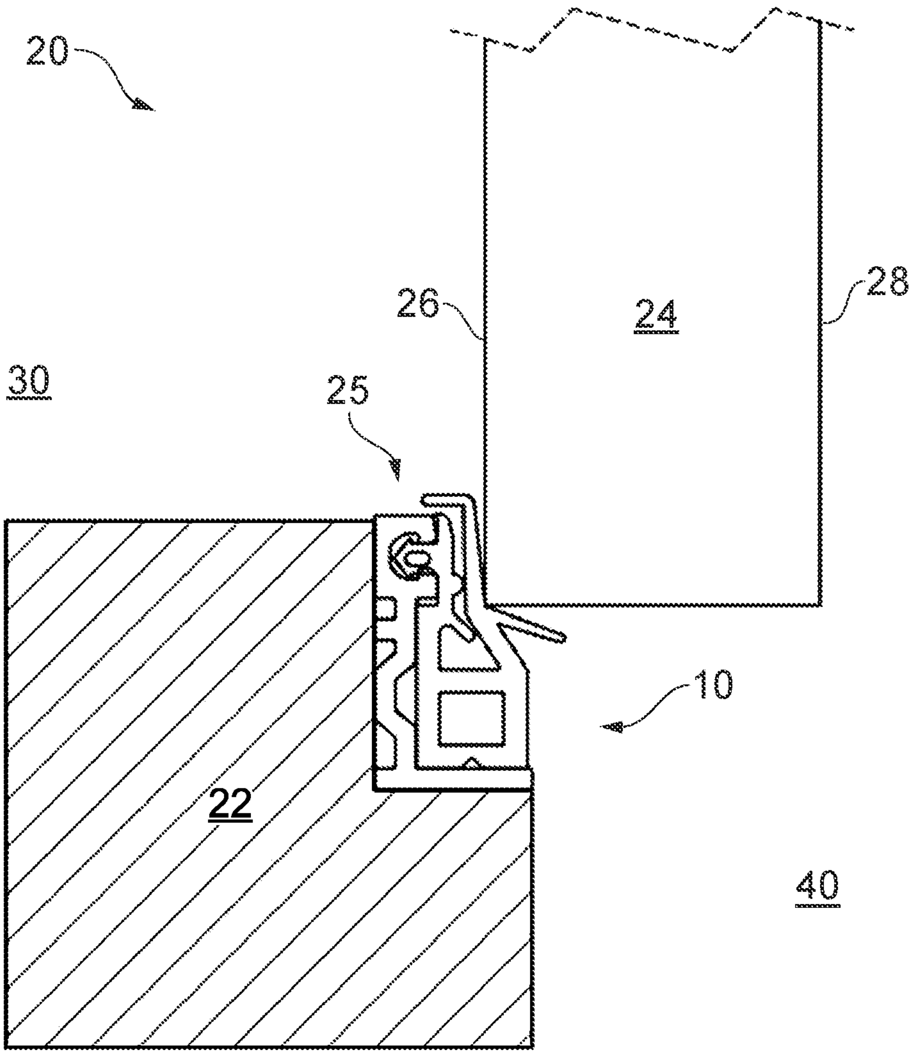
FIG. 1 is a cross-sectional view of an exemplary seal arrangement provided on a door.

FIG. 1 shows a seal arrangement 10 installed on a door 20. More particularly, FIG. 1 is a cross-sectional view of the door 20 with the seal arrangement 10. According to the present example, the seal arrangement 10 is provided on a timber door comprising a timber door frame 22 and a timber door leaf 24. Timber doors wherein the door frame and the door leaf are mainly or exclusively made from timber are oftentimes heritage doors, possibly on a listed building or within a conservation area.

The door 20 is shown in FIG. 1 in a closed configuration in which the door leaf 24 is brought close to the door frame 22, such that a gap 25 is formed between the door frame 22 and the door leaf 24. The door 20 is provided as an inward-opening door such that in the closed configuration, an outside face 26 of the door leaf 24 faces the door frame 22 while an inside face 28 faces away from the door frame 22.

The door 20 is configurable between an open configuration and the closed configuration. The door 20 is brought into the closed configuration by moving the door leaf 24 towards the door frame 22 in a closing direction. The door 20 is brought into the open configuration by moving the door leaf 24 away from the door frame 22 in an opening direction. The opening direction and the closing direction are opposite directions.

The seal arrangement 10 is located in the gap 25 between the door frame 22 and the door leaf 24 to prevent passage of water from one side of the door 20 to the other side of the door 20. In use, the seal arrangement 10 may thus prevent ingress of water from an outside space 30 to an inside space 40 when the door 20 is in a closed configuration. As shown in FIG. 1, the appearance of the door 20 from the outside 30 is substantially unaffected by the seal arrangement 10 concealed by the door frame 22.

The seal arrangement 10 is provided on the door frame 22. When closing the door 20, the door leaf 24 is moved towards the seal arrangement 10 until the door leaf 24 engages the seal arrangement 10. When opening the door 20, the door leaf 24 is moved away from the seal arrangement 10 and disengages the seal arrangement 10. Thus, the door 20 may be opened and closed as a regular door would be opened and closed, without necessitating further action in order to seal against ingress of water.

Figure 2:
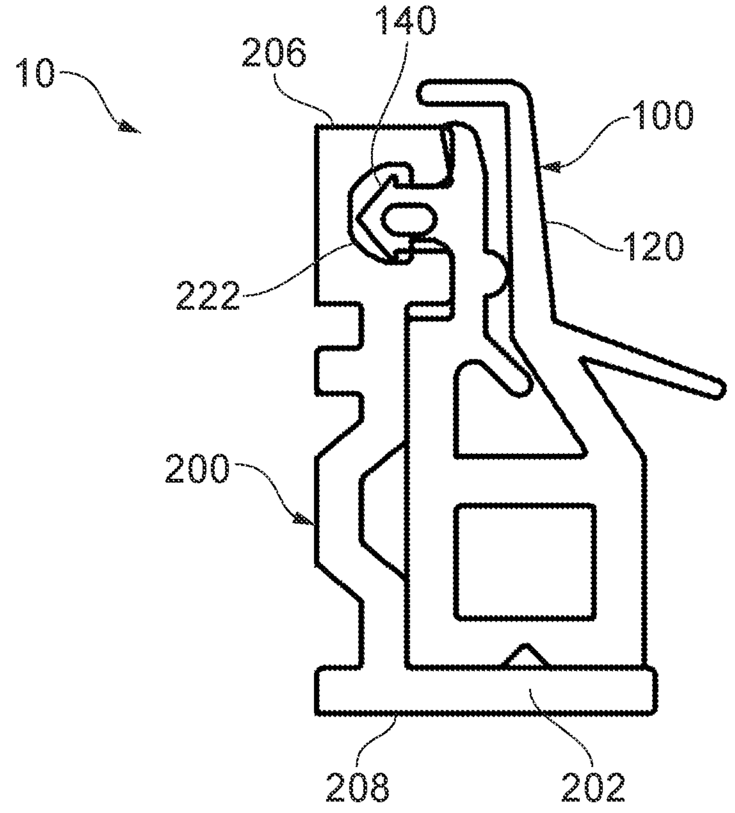
FIG. 2 is a cross-sectional view of the seal arrangement of FIG. 1.

FIG. 2 shows the seal arrangement 10 of FIG. 1. The seal arrangement 10 comprises a seal member 100 and a mounting member 200. The seal member 100 and the mounting member 200 are separate components joined together to provide the seal arrangement 10 (or 'seal assembly'). In use, the seal member 100 is retained by the mounting member 200, and the mounting member 200 is retained by the door frame 22. The seal member 100 is separable from the mounting member 200, for example in order to inspect, clean or replace the seal member 100. When joined, the seal member 100 and the mounting member 200 are joined along the entire interface between the seal member 100 and the mounting member 200.

The seal member 100 (or 'resilient' member) is a resiliently deformable member. The seal member 100 is deformable from an initial configuration to a deformed configuration, and is configured to reassume the initial configuration upon lifting of any forces causing deformation. In other words, the seal member 100 is biased to assume its original configuration. In use, the seal member 100 is brought into a deformed configuration upon closing of the door 20, with the seal member 100 being compressed between the mounting member 200 and the door leaf 24.

The mounting member 200 (or 'non-resilient' member) is a comparatively stiff member. That is to say, the mounting member 200 is less deformable than the seal member 100. Since the seal member 100 is deformable, it may be necessary to secure the seal member 100 along the whole length of the seal member 100 in order to prevent, for example, sagging of the seal member 100. By contrast, the mounting member 200 may in use be secured to the door frame 22 at discrete locations whilst, at the same time, retain the whole length of the seal member 100. In other words, the mounting member 200 interfaces the door frame 22 and the seal member 100.

Figure 3:
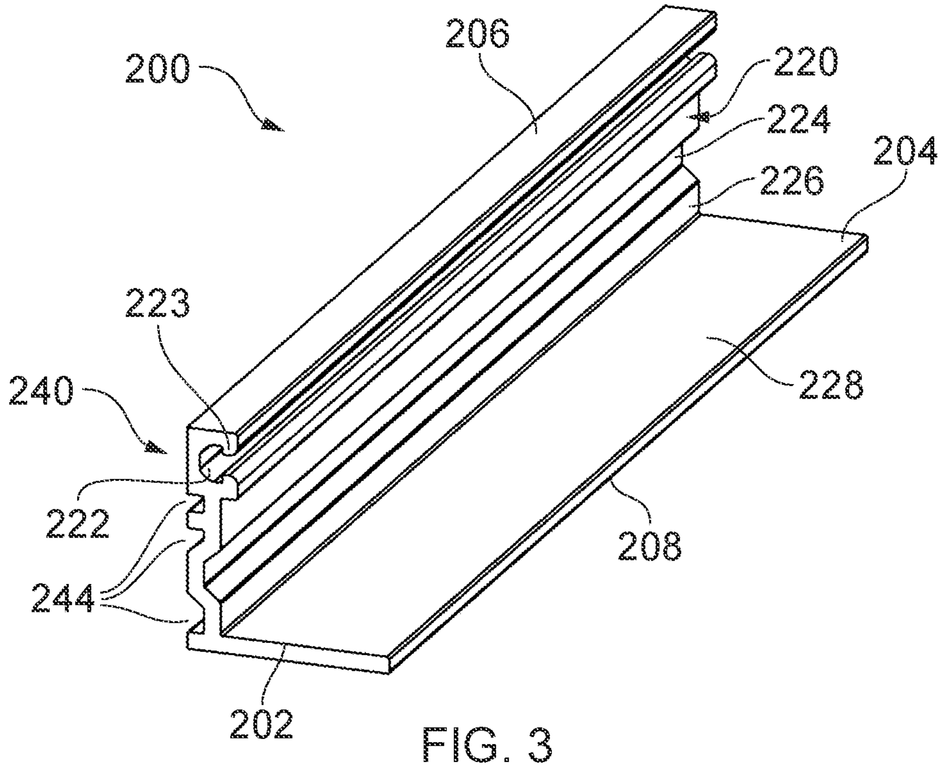
FIG. 3 is a perspective view of a mounting member of the seal arrangement of FIG. 1.

FIG. 3 is a perspective view of the mounting member 200.

The mounting member 200 has a first end 202 and a second end 204. The first end 202 and the second end 204 delimit a length of the mounting member 200. In use, the mounting member 200 may extend from one side of the door frame 22 to the other side of the door frame 22. Similarly, the mounting member 200 may extend along a side of the door frame 22.

The mounting member 200 comprises a head end 206 and a foot end 208. The head end 206 and the foot end 208 delimit a height of the mounting member 200.

The mounting member 200 forms a support surface 220 (or 'first surface' or 'first side') and a mounting surface 240 (or 'second surface' or 'second side'). The support surface 220 and the mounting surface 240 correspond to opposite sides of the mounting member 200, i.e. an inside and an outside. In use, the support surface 220 of the mounting member 200 engages the seal member 100, while the mounting surface 240 engages the door frame 22.

A channel 222 is formed in the support surface 220. The channel 222 is an elongate recess extending across the support surface 220, from the first end 202 of the mounting member 200 to the second end 204 of the mounting member

200. That is to say, the channel 222 extends along the whole length of the mounting member 200. According to the present example, the channel 222 is open ended at both ends 202, 204 of the mounting member 200.

The channel 222 comprises a constriction 223. The constriction 223 is a section of the channel 222 which is narrowed, i.e. constricted. The constriction 223 in use captures the seal member 100, thus preventing the seal member 100 from separating from the mounting member 200.

A support groove 224 is formed in the support surface 220. The support groove 224 is an elongate recess extending along the mounting member 200. The support groove 224 extends parallel to the channel 222, and extends from the first end 202 of the mounting member 200 to the second end 204 of the mounting member 200. According to the present example, the support groove 224 is open ended at both ends 202, 204 of the mounting member 200.

The support surface 220 comprises a first portion 226 and a second portion 228. When mated with the mounting member 200, the seal member 100 engages the first portion 226 and the second portion 228. The first portion 226 and the second portion 228 of the support surface 220 are provided at an angle, i.e. are not aligned. More specifically, the first portion 226 and the second portion 228 are arranged perpendicular. In use, the first portion 226 extends vertically and the second portion 228 extends horizontally. Thus, the first portion 226 supports the seal member 100 against pressure exerted thereon by the door leaf 24, while the second portion 228 supports the seal member 100 against pressure exerted by floodwater pushing into the gap 25 between the door frame 22 and the door leaf 24.

The channel 222 and the support groove 224 are located in the first portion 226 of the support surface 220. More particularly, the channel 222 and the support groove 224 are provided adjacent to one another.

The mounting surface 240 defines a mounting groove 244. The mounting groove 244 is an elongate recess extending along the mounting member 200. According to the present example, the mounting groove 244 is open ended at both ends 202, 204 of the mounting member 200. When secured to the door frame 22, the mounting groove 244 extends along the door frame 22 and is open towards the door frame 22. The mounting groove 244 is configured to receive adhesive to bond the mounting member 200 to door frame 22. Similarly, the mounting groove 224 may receive sealant to seal any gap between the mounting member 200 and the door frame 22.

Figure 4:
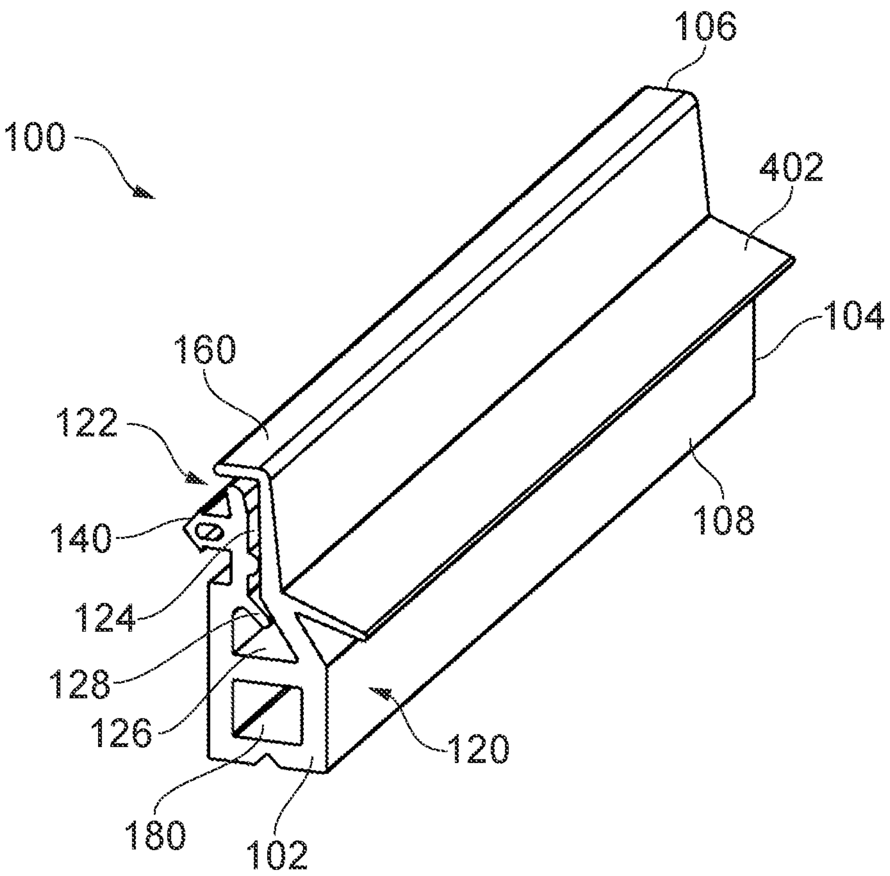
FIG. 4 is a perspective view of a seal member of the seal arrangement of FIG. 1.

FIG. 4 is a perspective view of the seal member 100.

The seal member 100 has a first end 102 and a second end 104. The first end 102 and the second end 104 delimit a length of the seal member 100. In use, the seal member 100 may extend from one side of the door frame 22 to the other side of the door frame 22. Similarly, the seal member 100 may extend along a side of the door frame 22.

The seal member 100 comprises a top end 106 and a bottom end 108. The top end 106 and the bottom end 108 are opposite ends delimiting a height of the seal member 100.

The seal member 100 comprises a main body 120. The main body 120 in use is compressed between the support surface 220 and the door leaf 24.

The main body 120 defines an inlet 122. The inlet 122 is an opening into which water is received in the event of a flood. In use, the inlet 122 is located above the door frame 22 and faces towards the outside 30, i.e. away from the door leaf 24 (see FIG. 8, for example). The inlet 122 connects to a water chamber 124 and an expansion chamber 126. The water chamber 124 is configured to receive water through the inlet 122. The water chamber 124 and the expansion chamber 126 are separated by a gate 128 (or 'protrusion') extending therebetween. The gate 128 is moveable by water pressure, such that rising water pressure forces water into the expansion chamber 126.

The seal member 100 comprises a head 140. The head 140 is a protrusion from the main body 120 and provided with an enlarged end. The head 140 extends from the first end 102 of the seal member 100 to the second end 104 of the seal member 100. The head 140 is located closer to the top end 106 of the seal member 100 than to the bottom end 108.

The head 140 in use secures the seal member 100 to the mounting member 200. More particularly, the head 140 of the seal member 100 is insertable into the channel 222 of the mounting member 200 to mate the seal member 100 and the mounting member 200. When so mated, the head 140 is captured in the channel 222 by means of the constriction 223, and the main body 120 of the seal member 100 is located against the support surface 220.

The seal member 100 comprises a cap 160. The cap 160 is configured to extend at least partially over the inlet 122. In use the cap 160 inhibits ingress of dirt and detritus into the seal member 100.

The seal member 100 defines a void 180. The void 180 is an empty space enclosed by the seal member 100. The void 180 is open at both ends of the seal member 100.

Figure 5:
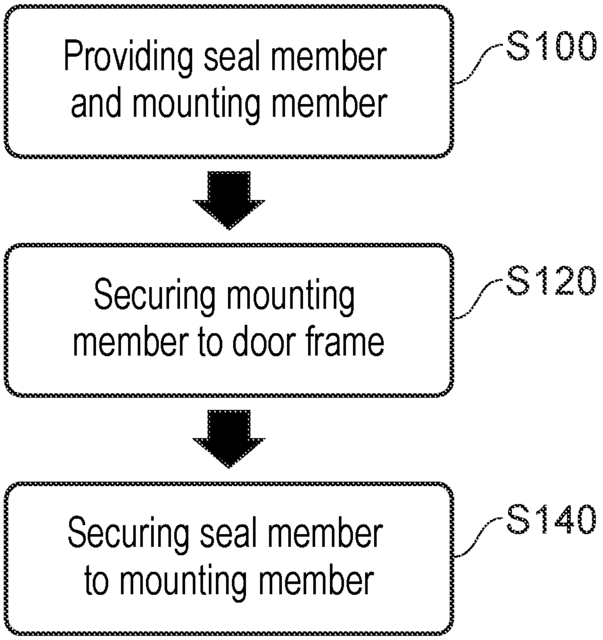
FIG. 5 illustrates a method of fitting the seal arrangement.

FIG. 5 illustrates a method of flood-proofing a timber door.

The method comprises a step S100 of providing a kit of parts for assembling a seal arrangement 10 as described above S100.

The method further comprises a step S120 of securing the mounting member 200 of the seal arrangement 10 to the door frame 22. The mounting member 200 is secured such that the support surface 220 faces the door leaf 24 when the door 20 is in a closed configuration. Suitable means for securing the mounting member 200 to the door frame 22 may include mechanical fasteners, such as nails and screws, as well as adhesive.

The method further comprises a step S140 of securing the seal member 100 to the mounting member 200. The seal member 100 is secured to the mounting member 200 by inserting the head 140 into the channel 222. In particular, the head 140 is insertable through the constriction 223 to accommodate the head 140 in the channel 222. When so accommodated, the constriction 223 captures the head 140 in the channel 222 and inhibits removal of the head 140 from the channel 222.

Depending on the door frame, adjustments may be necessary in order to seat and support the seal arrangement 10 suitably.

Figure 6:
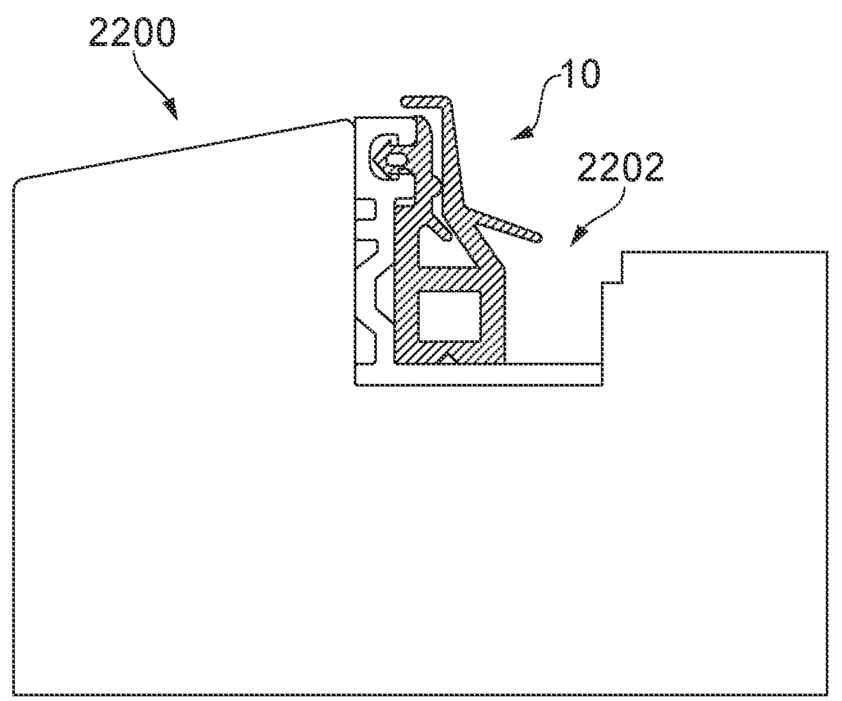
FIG. 6 is a cross-sectional view of the seal arrangement provided on another door.
Figure 7:
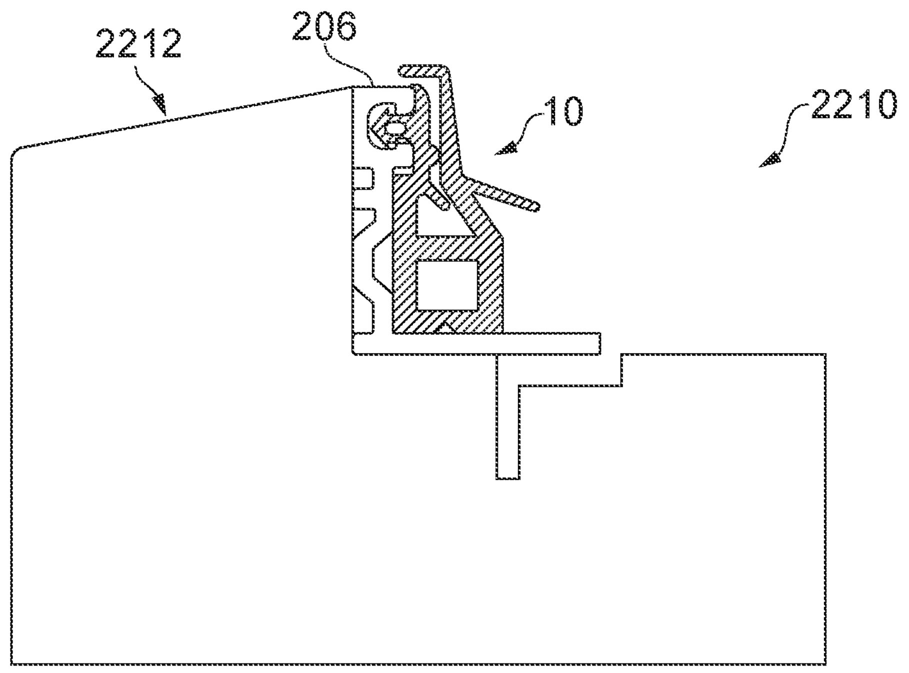
FIG. 7 is a cross-sectional view of the seal arrangement provided on yet another door.

FIGS. 6 and 7 illustrate the seal arrangement 10 installed in door frames 2200, 2210 which are so adjusted. FIG. 6 shows an example wherein the door frame 2200 is adjusted by removal of material in order to provide a recess 2202 in which the seal arrangement 10 is seated. FIG. 7 shows an example wherein timber 2212 is planted on the door frame 2210 in order to extend the door frame 2210.

The method described with reference to FIGS. 5, 6 and 7 may be carried out without removal of the door frame 22, 2200, 2210.

The seal member 100 is removable, for example for purposes of replacing with a new seal member, by pulling the seal member 100 away from the mounting member 200. In particular, the seal member 100 is pulled in a direction perpendicular to the channel 222 or the first portion 226 of the support surface 220. Thereby the head 140 of the seal member 100 is removed from the channel 222, and the seal member 100 and the mounting member 200 unmated.

Figure 8:
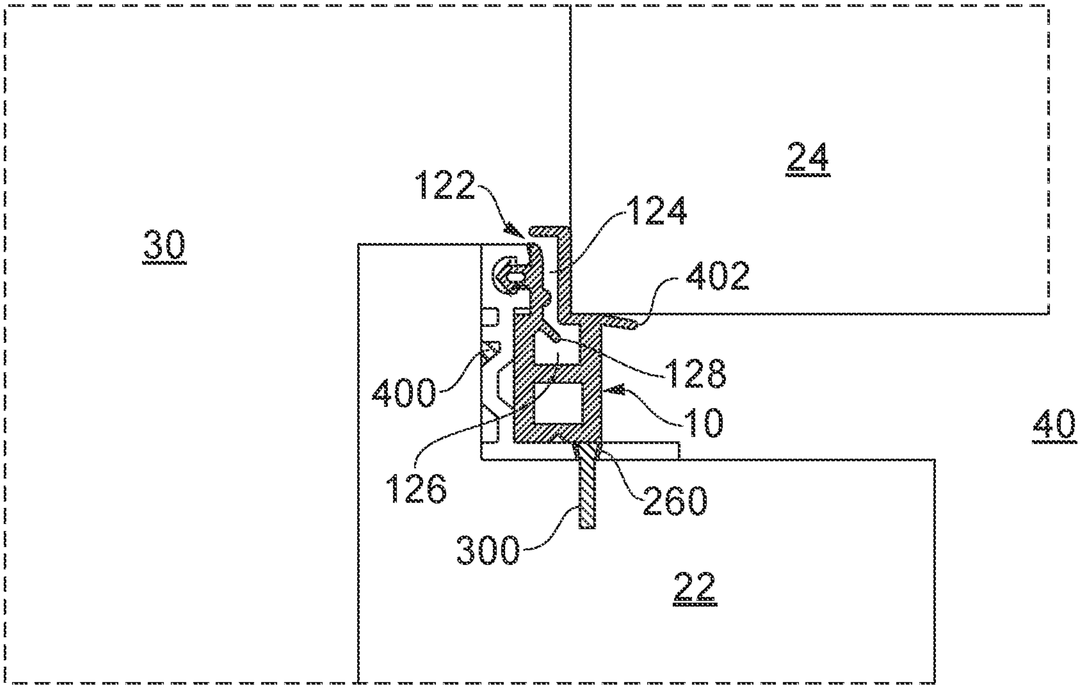
FIG. 8 is a cross-sectional view of the seal arrangement provided on a flooded door.

FIG. 8 is a cross-sectional view of the door 20 wherein the outside 30 is flooded. In this example, the water chamber 124 receives the floodwater through the inlet 122. The pressure of the water causes the gate 128 to move such that water enters the expansion chamber 126. In this example, when water enters the expansion chamber 126, the pressure in the expansion chamber causes the expansion chamber 126 to expand. The expansion occurs when the resilient material defining the expansion chamber 126 deforms. Expansion of the expansion chamber creates a stronger (e.g., more enhanced) flood seal between the seal member 100 and the door leaf 24. Expansion of the expansion chamber 126 due to floodwater pressure may create an enhanced flood seal due to the resilient material of the seal member 100 being pressed harder against the door leaf 24, for example.

Expansion of the expansion chamber 126 due to floodwater pressure may create an enhanced flood seal due to a greater contact surface area between the resilient material of the seal member 100 and the door leaf 24, for example. For example, a greater contact surface area may be created between a seal fin 402 and the door leaf 24. In this example, the seal member 100 comprises a seal fin 402 which protrudes from the main body 120. When the seal arrangement is deployed on a door, the seal fin 402 extends towards the inside, in other words, away from the door frame 22. When the expansion chamber 126 is not expanded (e.g., the expansion chamber 126 is in an undeformed state), the seal fin 402 points diagonally downwards (with respect to the orientation shown in the Figures). For example, in the undeformed state, the seal fin 402 is at an angle relative to the first portion 220 and points diagonally towards the direction of the second portion 228. When the expansion chamber expands, the expansion causes the seal fin 402 to change angle. For example, the angle of the seal fin 402 changes such that a greater part of the seal fin 402 comes into contact with the door leaf 24. For example, expansion of the expansion chamber 126 cause the seal fin 402 to have a more horizontal angle with respect to the orientation shown in the Figures (compare FIGS. 8 and 9).

In these examples, the greater the floodwater pressure, the more enhanced the flood seal may become due to the above-described structures and effects of the examples described herein. Accordingly, in these examples, as the floodwater pressure increases, a tighter flood seal is created. The first portion 226 and the second portion 228 may provide support to the seal member 100 such that deformation of the resilient material occurs more readily at parts around and in contact with the door leaf 24, for example. For example, the second portion 228 supports the seal member 100 against pressure exerted by floodwater. Accordingly, the first portion 226 and the second portion 228 in the described arrangements may direct the response of the seal member 100 to floodwater pressure into forming an effective flood seal, for example.

The mounting member 200 comprises an aperture 260 extending from the support surface 220 to the mounting surface 240. The aperture 260 is provided in the second portion 228 of the support surface 220. According to the present example, the aperture 260 is provided as a countersink. A mechanical fastener 300 extends through the aperture 260 and into the door frame 22, securing the mounting member 200 to the door frame 22.

Adhesive 400 is provided in the mounting groove 244.

While the examples discussed with reference to the Figures relate to timber doors, the present disclosure is applicable also to timber windows. Furthermore, the present disclosure is applicable also to doors or windows made from other materials.

The seal arrangement 10 is provided as a two-part seal. Thus, the components of the seal arrangement 10, i.e. the seal member 100 and the mounting member 200, are manufacturable separately.

The seal member 100 is provided as a strip seal. The gap 25 between the door frame 22 and the door leaf 24 is elongate and the seal member 100 is correspondingly elongate.

The mounting member 200 is manufacturable as an extrusion, for example from a suitable plastics material. According to other examples, the mounting member 200 is made from metal or metal alloys, preferably aluminium and related alloys.

The kit of parts 10 provides separately the seal member 100 and the mounting member 200, which in use interfaces the seal member 100 and the door 20. Hence, the door 20 may not require labour-intensive modification but may instead be straightforward to modify for purposes of fitting and securing the mounting member. In particular, it is not necessary to outfit the door with a channel capturing part of the seal member. Moreover, it may not be possible to add a channel to the timber door/window without causing damage to the timber as a result of the structure thereof, for example the presence of a knot. Particularly when attempting to cut a relatively small structure into timber, such as the channel, incidental damage to the timber may make this difficult to achieve. Accordingly, the examples described herein are particularly advantageous when deployed on doors/windows where creating channels in the doors/windows is to be avoided or not possible.

The first portion 226 and the second portion 228 of the support surface 220 may in use support the seal member 100 against deformation and/or displacement in a plurality of directions. Thus, response of the seal member 100 to pressure resulting from floodwater may be improved and efficacy of the flood seal increased.

Mechanical fasteners are preferably added through the second portion 228 of the support portion 220.

The seal member 100 is preferably removable from the mounting member 200, for example to replace with a new seal member or clean and replace the seal member which is in use.

Providing a mounting groove 244 in use creates a volume of space between the mounting surface 240 and increases surface area of the mounting surface. Thus, improved adhesion may be achieved when providing the mounting surface 240 with adhesive, or improved sealing may be achieved when providing the mounting surface 240 with sealant.

Figure 9:
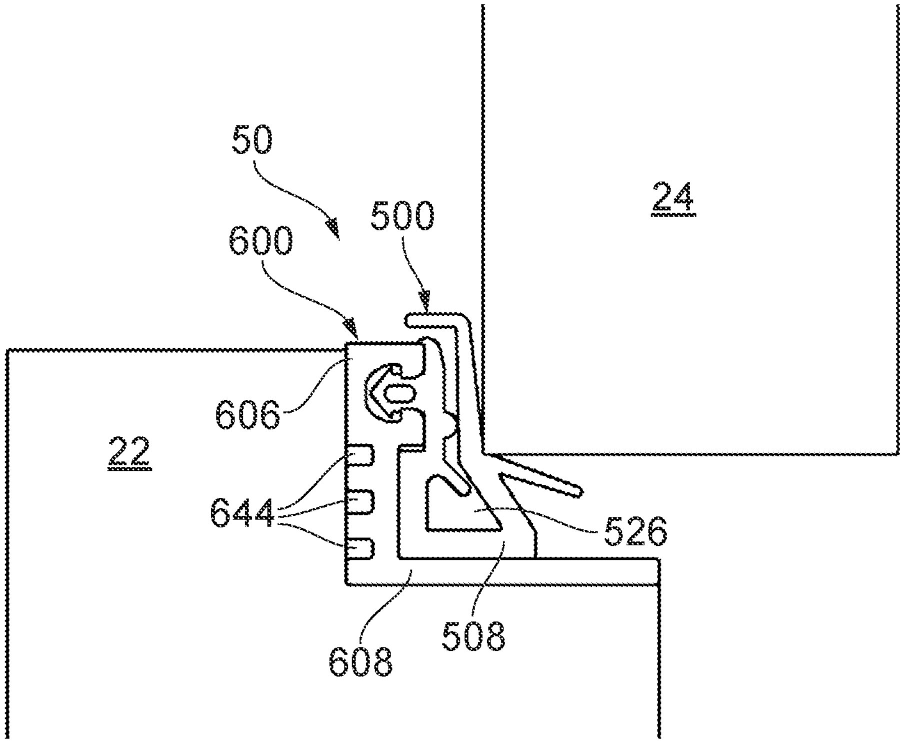
FIG. 9 is a cross-sectional view of another exemplary seal arrangement provided on a door.
Figure 10:
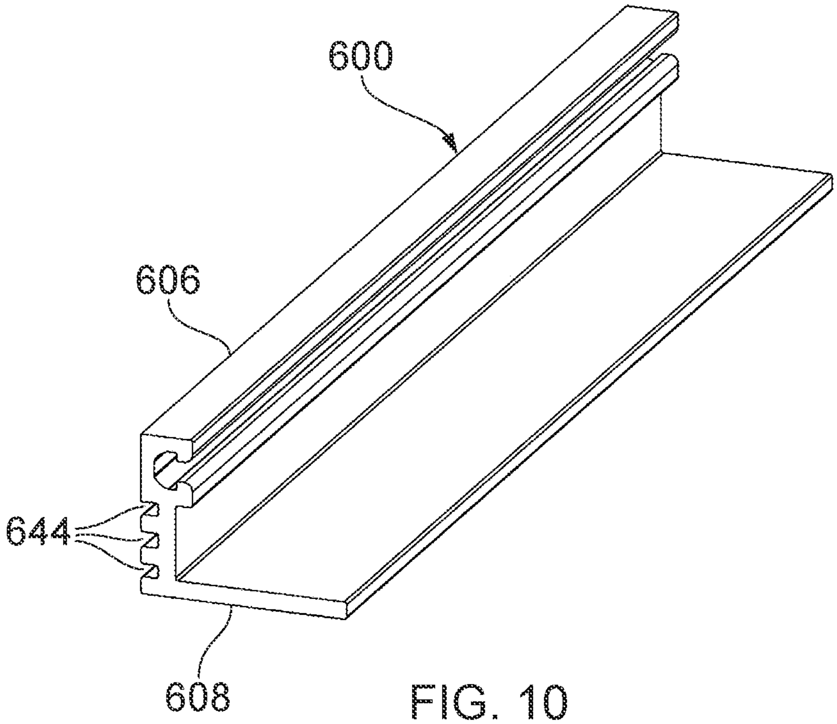
FIG. 10 is a perspective view of a mounting member of the seal arrangement of FIG. 9.
Figure 11:
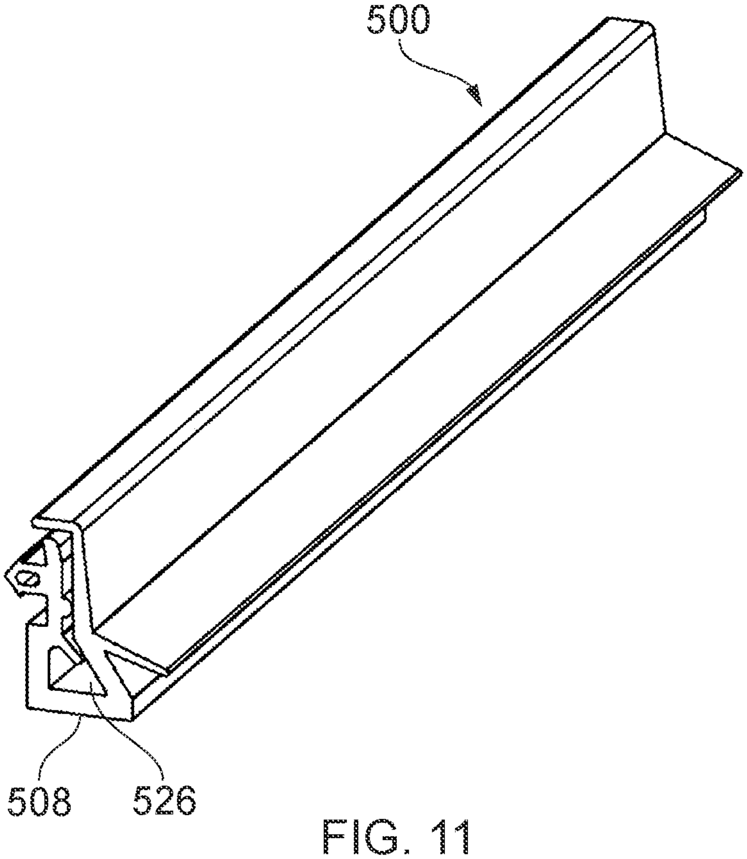
FIG. 11 is a perspective view of a seal member of the seal arrangement of FIG. 9.

FIGS. 9, 10 and 11 show another seal arrangement 50 as a further example. FIG. 9 is a cross-sectional view of the door frame 22 and the door leaf 24, with the seal arrangement 50 mounted to the door frame 22. This seal arrangement 50 is also provided as a two-part seal comprising a seal member 500 and a support member 600. FIG. 10 is a perspective view of the support member 600, while FIG. 11 is a perspective view of the seal member 500. For the sake of brevity, description of features of the seal arrangement 50 that correspond to features described above in relation to the seal arrangement 10 of FIG. 2 is not repeated.

According to this example, the seal member 500 is provided without the void 180. An expansion chamber 526 of the seal member 500 defines a bottom end 508 of the seal member 500. In use, the expansion chamber 526 rests directly on the support member 600, being directly supported against pressure in a downwards direction.

According to this example, the support member 600 comprises three mounting grooves 644.

According to this example, the support member 600 has no support groove 224.

Similar to the example shown in FIG. 1, a head end 606 and a foot end 608 are arranged flush with the door frame 22, wherein the head end 606 is arranged flush with a horizontal surface of the door frame 22 and the foot end 608 is arranged flush with a vertical surface of the door frame 22.

As evident from the preceding description, in some examples, there may be provided a kit of parts 10 configured to flood-proof a door 20, the kit of parts 10 comprising: a resilient seal member 100 comprising a main body 120, and a head 140, wherein: the resilient seal member 100 is configured to respond to pressure resulting from floodwater to enhance, in use, a flood seal created by the kit of parts; and a non-resilient mounting member 200 for securing the seal member to a door frame 22, the mounting member 200 defining a support surface 220 configured to receive the seal member 100 and defining a mounting surface 240 locatable against the door frame, wherein a channel 222 is formed in the support surface 220, and the head 140 of the seal member 100 is insertable into the channel 222 to mate the seal member 100 and the mounting member 200. In some such examples, the support surface 220 comprises the first portion 226 and the second portion 228, the main body 120 of the seal member engaging the first portion 226 and the second portion 228 when mated with the mounting member 200, wherein the first portion 226 and the second portion 228 are arranged perpendicular to one another; and the first portion 226 and the second portion 228 of the support surface 220, in use, support the seal member 100 against deformation and/or displacement in a plurality of directions to improve the response of the seal member 100 to pressure resulting from floodwater to thereby enhance the flood seal. For example, to configure the seal member 100 to respond to pressure resulting from floodwater to enhance, in use, a flood seal created by the kit of parts, the resilient seal member 100 may comprise an expansion chamber 126 configured to receive water as a result of rising floodwater pressure, and to expand to enhance the flood seal in response to the rising floodwater pressure. In some such examples, the second portion 228 supports the seal member 100 against pressure exerted by the floodwater, which pressure causes the expansion chamber to expand.

Many domestic homes are known to have inward-opening doors. The examples of the seal arrangement are particularly suitable for inward-opening doors and, hence, suitable for many domestic homes.

In summary, exemplary embodiments of a seal arrangement have been described. The described exemplary embodiments provide for an improved seal arrangement. Additionally, the described exemplary embodiments are convenient to manufacture and straightforward to use.

The seal arrangement may be manufactured industrially. An industrial application of the example embodiments will be clear from the discussion herein.

Although preferred embodiment(s) of the present invention have been shown and described, it will be appreciated by those skilled in the art that changes may be made without departing from the scope of the invention as defined in the claims.

The invention claimed is:

1. A kit of parts configured to flood-proof a door, comprising:

a seal member that is resilient and comprising a main body, a head, and an expansion chamber, wherein the seal member is configured such that rising floodwater pressure forces floodwater into the expansion chamber, thereby causing the seal member to respond to pressure resulting from floodwater to enhance a flood seal created by the kit of parts; and a non-resilient mounting member for securing the seal member to a door frame, the mounting member defining a support surface configured to receive the seal member and defining a mounting surface locatable against the door frame, wherein a channel is formed in the support surface, and the head of the seal member is insertable into the channel to mate the seal member and the mounting member.

2. The kit of parts according to claim 1, wherein:

the support surface comprises a first portion and a second portion, the main body of the seal member engaging the first portion and the second portion when mated with the mounting member, wherein the first portion and the second portion are arranged perpendicular.

3. The kit of parts according to claim 2, wherein the channel is formed in the first portion of the support surface; and a plurality of apertures for receiving mechanical fasteners is formed in the second portion of the support surface.

4. The kit of parts according to claim 2, the mounting member comprising a groove formed in the support surface, and the seal member extends across the groove when the seal member and the mounting member are mated.

5. The kit of parts according to claim 4, wherein the groove is formed in the first portion of the support surface.

6. The kit of parts according to claim 1, wherein the seal member is removable from the mounting member by pulling the seal member away from the mounting member and removing the head of the seal member from the channel in the mounting member.

7. The kit of parts according to claim 1, wherein a groove for receiving sealant or adhesive is formed in the mounting surface.

8. A timber door comprising a door frame, wherein the kit of parts according to claim 1 is fitted to the door frame.

9. The timber door according to claim 8, further comprising a mechanical fastener securing the flood seal to the door frame;

wherein the support surface of the mounting member comprises a first portion and a second portion, the first portion and the second portion being perpendicular;

the main body of the seal member engaging the first portion and the second portion when mated with the mounting member; and the mechanical fastener extends through the second portion of the support surface.

10. The timber door according to claim 8, wherein the timber door is provided as an inward-opening timber door.

11. The timber door according to claim 8, wherein a head end of the mounting member is arranged flush with the door frame.

12. The timber door according to claim 8, wherein a groove is formed in the mounting surface, and adhesive is provided in the groove to secure the mounting member to the door frame.

13. A method of flood-proofing a timber door, the method comprising:

providing a kit of parts according to claim 1, securing the mounting member to a door frame of the timber door, securing the seal member to the mounting member.

14. The method according to claim 13, further comprising:

removing part of the door frame to form a recess in the door frame, and locating the mounting member in the recess before securing the mounting member to the door frame.

15. The method according to claim 13, further comprising:

securing additional timber to the door frame, and locating the mounting member against the additional timber before securing the mounting member to the door frame.

16. The method according to claim 13, wherein securing the mounting member to the door frame comprises locating a mechanical fastener through the mounting member and subsequently securing the seal member to the mounting member.

* * * * *